(12) United States Patent
Myers et al.

(10) Patent No.: US 10,151,136 B2
(45) Date of Patent: *Dec. 11, 2018

(54) METHODS AND SYSTEMS FOR OPENING OF A VEHICLE ACCESS POINT USING AUDIO OR VIDEO DATA ASSOCIATED WITH A USER

(71) Applicant: Ford Global Technologies, LLC., Dearborn, MI (US)

(72) Inventors: Scott Vincent Myers, Camarillo, CA (US); Venkatapathi Raju Nallapa, Fairfield, CA (US); Alexandru Mihai Gurghian, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,668

(22) Filed: Sep. 18, 2017

(65) Prior Publication Data

US 2018/0002972 A1 Jan. 4, 2018

Related U.S. Application Data

(63) Continuation of application No. 15/045,890, filed on Feb. 17, 2016, now Pat. No. 9,816,308.

(51) Int. Cl.
*G08B 21/00* (2006.01)
*E05F 15/73* (2015.01)
(Continued)

(52) U.S. Cl.
CPC ............. *E05F 15/73* (2015.01); *E05B 81/08* (2013.01); *E05B 81/78* (2013.01); *E05F 15/76* (2015.01);
(Continued)

(58) Field of Classification Search
CPC ............ G07C 9/00309; G07C 2209/64; G07C 2209/65; E05F 15/73; E05F 2015/767
(Continued)

(56) References Cited

U.S. PATENT DOCUMENTS 7,688,179 B2 3/2010 Kurpinski
2006/0294393 A1* 12/2006 McCall ..................... H04L 9/32
713/186

(Continued)

FOREIGN PATENT DOCUMENTS

CN 104163149 8/2016

OTHER PUBLICATIONS

Ford's new kick-activated tailgate provides hands-free opening http://www.gizmag.com/fordkickactivatedtailgate/21746/.

*Primary Examiner* — Mark Rushing
(74) *Attorney, Agent, or Firm* — David R. Stevens; Stevens Law Group

(57) ABSTRACT

Methods and systems for opening an access point of a vehicle. A system and a method may involve receiving wirelessly a signal from a remote controller carried by a user. The system and the method may further involve receiving audio or video data indicating the user approaching the vehicle. The system and the method may also involve determining an intention of the user to access an interior of the vehicle based on the audio or video data. The system and the method may also involve opening an access point of the vehicle responsive to the determining of the intention of the user to access the interior of the vehicle.

16 Claims, 4 Drawing Sheets

(51) Int. Cl.
*E05F 15/76* (2015.01)
*E05F 15/77* (2015.01)
*E05B 81/08* (2014.01)
*E05B 81/78* (2014.01)
*G06K 9/00* (2006.01)
*G08C 17/02* (2006.01)

(52) U.S. Cl.
CPC .......... *E05F 15/77* (2015.01); *G06K 9/00308* (2013.01); *G06K 9/00369* (2013.01); *G08C 17/02* (2013.01); *E05F 2015/763* (2015.01); *E05F 2015/767* (2015.01); *E05Y 2900/50* (2013.01)

(58) Field of Classification Search
USPC ..................................................... 340/426.15
See application file for complete search history.

(56) References Cited

U.S. PATENT DOCUMENTS

| | | |
|---|---|---|
| 2011/0210821 A1 | 9/2011 | Gehin |
| 2014/0169139 A1 | 6/2014 | Lee |
| 2015/0102989 A1 | 4/2015 | Lee |

* cited by examiner

METHODS AND SYSTEMS FOR OPENING OF A VEHICLE ACCESS POINT USING AUDIO OR VIDEO DATA ASSOCIATED WITH A USER

CROSS REFERENCE TO RELATED PATENT APPLICATION(S)

The present disclosure is part of a continuation of U.S. patent application Ser. No. 15/045,890, filed on Feb. 17, 2016, the content of which is incorporated by reference in its entirety.

TECHNICAL FIELD

The present disclosure generally relates to methods and systems for opening an access point of a vehicle.

BACKGROUND

Conventionally, a manual operation is required to open a trunk door, a hatch door or any other door (hereinafter generally referred to as "access point") of a vehicle. Recent development in automotive systems and automation has offered an alternative for a user to unlock and open one of the vehicle access points with a remote controller such as a key fob. For example, a key fob that is in possession of the user may be able to communicate to the vehicle wirelessly when the user is within a certain range from the vehicle. When a button on the key fob is pressed, the key fob may transmit a wireless signal to communicate with the vehicle to unlock access point(s). When the same or a different button on the key fob is pressed, the key fob may further transmit another wireless signal to communicate with the vehicle to open one or more access points, such as the trunk door for example. Nevertheless, the key fob still requires a manual operation by the user to press on the button(s) to unlock and open the access point in this example.

This manual operation, though minimal, imposes difficulties or at least inconvenience in some practical scenarios. For example, the user may have both hands loaded with grocery bags or other items and thus lacks a free hand to hold and operate the key fob to unlock and open the access point. As another example, the user may approach the vehicle with both hands pushing a shopping cart or a baby stroller and thus lack a free hand, unless the user stops his/her movement toward the vehicle to free up one hand to fetch the key fob. Moreover, the key fob is often stored at an inconvenient location (e.g., in an inner pocket of a purse or a backpack) for the user to fetch, and the user may not remember where the key fob is stored and thus may have to search through various pockets in order to locate it. As yet another example, the user, if senior or disabled, may be approaching the vehicle in or pushing a wheelchair or with a walker, and lack a free hand to operate the key fob. All these practical scenarios make difficult the manual operation of opening the access point, e.g., trunk door, or any other access point on the vehicle with a remote controller such as a key fob.

Some alternatives have been developed to avoid using a manual operation. For instance, a kick switch may be provided on the vehicle for the user to kick or step on to open the access point, e.g., trunk door, when the user lacks a free hand. However, the solution may not be feasible to everyone, as some users may be disabled and not able to operate the kick switch. Besides, even for people who are not disabled, it requires dexterity to operate the kick switch while both hands are loaded with carried items, and the operation may cause imbalance for the user, especially when the surface is rough, slippery, or under inclement weather conditions. Another disadvantage of using a kick switch is that the user is not able to trigger the opening of the access point when he or she is still at a distance from the vehicle. Instead, the user needs to be physically close to the vehicle, step on or otherwise contact the kick switch, and wait for the access point to open (possible with both hands fully loaded with items).

Notably, simply unlocking and opening the trunk door every time the user approaches the vehicle with the key fob is not a feasible solution either. The user may approach the vehicle without an intention to unlock or to open any access point of the vehicle. For example, the user may return to the vehicle merely intending to visually check if a purse is left on the seat by seeing through the window. As another example, the user may intend to gain access to the cabin of the vehicle and not the trunk of the vehicle, and in such case having the access point automatically unlocked and/or opened would serve no purpose.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

As stated previously, a user may lack a free hand or may be unable to manually open an access point (e.g., a side door or a trunk door) of a vehicle as he or she intends while approaching the vehicle. In order for the vehicle to automatically open an access point intended by the user in this situation, methods and systems implementable in vehicles are presented herein.

Figure 1:
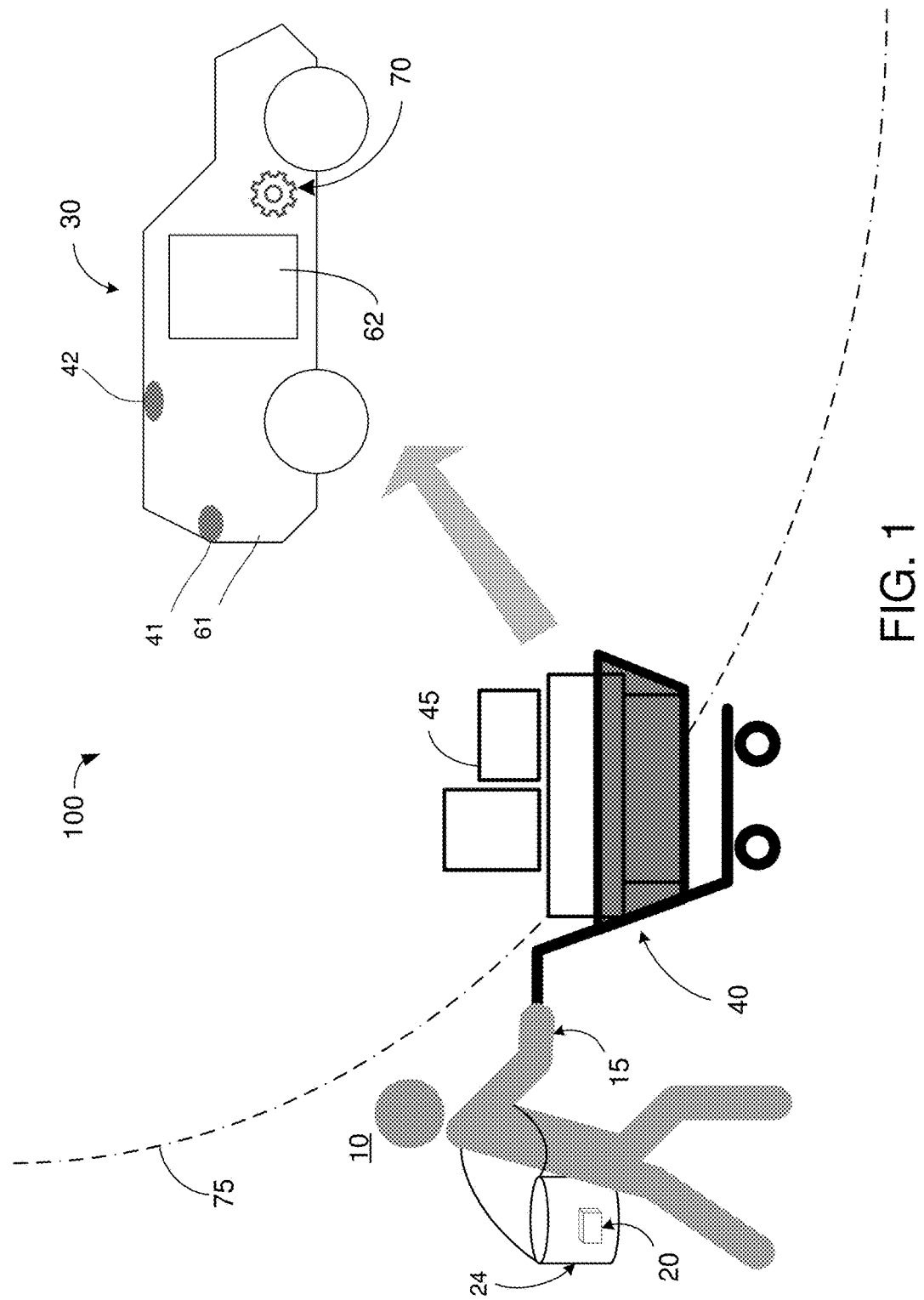
FIG. 1 is a diagram depicting an example scenario in which embodiments in accordance with the present disclosure may be utilized.
Figure 2:
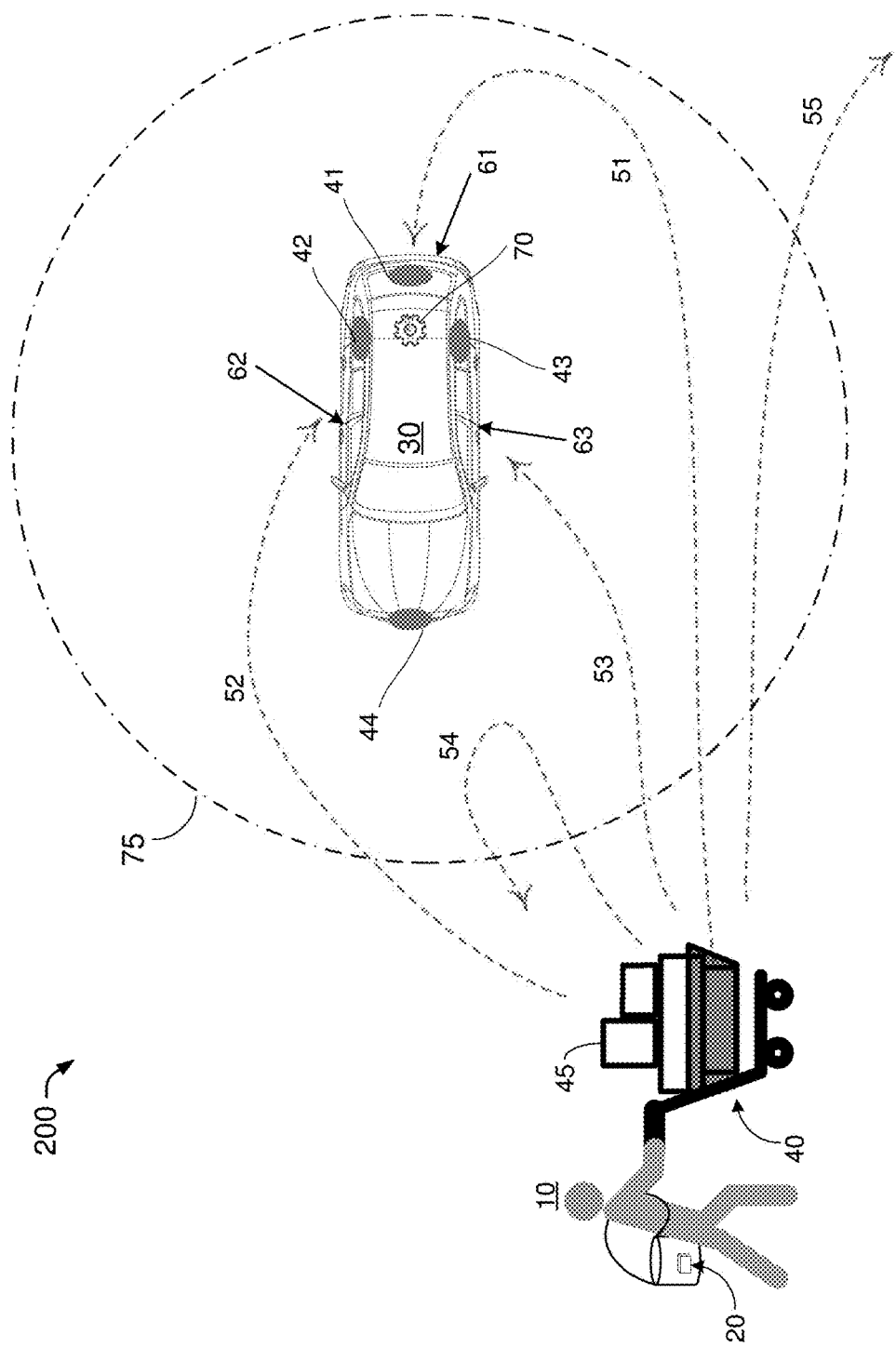
FIG. 2 is a diagram depicting example moving trajectories of a user with respect to a vehicle in accordance with an embodiment of the present disclosure.

Each of FIGS. 1 and 2 respectively illustrate an example scenario pertaining to a method and a system in accordance with the present disclosure. The following description is provided with reference to FIG. 1 and FIG. 2. In scenario 100 shown in FIG. 1 and scenario 200 shown in FIG. 2, user 10 is approaching vehicle 30 with remote controller 20, such as a key fob of the vehicle, carried in purse or backpack 24 of the user 10. User 10 has both hands 15 pushing shopping cart 40, which is loaded with items 45, and intends to access a storage area inside vehicle 30 by opening rear access point 61 of vehicle 30. However, given that both hands 15 of user 10 are pushing shopping cart 40, user 10 lacks a free hand to fetch remote controller 20 to unlock and open rear access point 61.

Vehicle 30 is equipped with system 70 that is able to communicate with, or at least receive wireless signals from, remote controller 20 when remote controller 20 is within certain range 75 from system 70. When user 10 is physically within range 75 from vehicle 30, along with remote controller 20 and shopping cart 40, system 70 may receive a signal transmitted wirelessly from remote controller 20. The signal may serve as a trigger to start a process performed by system 70.

Vehicle 30 may be also equipped with one or more sensors such as sensors 41, 42, 43 and 44, which in some embodiments may be part of system 70. Although the examples provided herein show a fixed quantity of sensors (i.e., four), a different quantity may be employed in various implementations in accordance with the present disclosure. Each, some or all of sensors 41, 42, 43 and 44 may be configured to generate audio data, video data, or a combination of both, related to user 10 as user 10 approaches vehicle 30. In some embodiments, sensors 41, 42, 43 and 44 may include a video camera configured to track a movement of user 10 and generate a video indicating that user 10 is approaching vehicle 30. In some embodiments, sensors 41, 42, 43 and 44 may include a microphone configured to capture a voice command from user 10 as user 10 approaches vehicle 30. In some embodiments, more than one of sensors 41, 42, 43 and 44 may be working concurrently as user 10 approaches, with each sensor generating audio and/or video data, or a combination of both, indicating that user 10 is approaching vehicle 30.

Based on the audio data and/or video data generated by one or more of sensors 41-44, system 70 determines whether user 10 has an intention to access an interior of vehicle 30 (e.g., trunk or cabin of vehicle 30). If it is determined that user 10 does have an intention to access the interior of vehicle 30, system 70 proceeds to open an access point (e.g., a trunk door or side door) of vehicle 30 through which system 70 determines that user 10 intends to access the interior of vehicle 30. In some embodiments, system 70 opens the access point by energizing one or more actuators (not shown in the figures) provided on vehicle 30. Each of the one or more actuators may be mechanical, electrical, electromechanical, magnetic, pneumatic and/or hydraulic in nature, and may be configured to open and/or close a respective access point of vehicle 30 under the control of system 70.

Many factors may be considered by system 70 in determining the intention of user 10. In some embodiments, system 70 may first analyze the audio data and recognize a voice command from user 10, such as "open trunk door", "open driver's door", "open hatchback door", "open front passenger door", "open rear passenger door", "open left sliding door", "open right sliding door" and the like. Upon recognizing such voice commands, system 70 may determine that user 10 has an intention to access the interior (e.g., trunk or cabin) of vehicle 30. Furthermore, system 70 may also determine which access point of multiple access points of vehicle 30 through which user 10 intends to gain access to the interior of vehicle 30. For instance, system 70 may determine that user 10 intends to access the trunk of vehicle 30 based on the video data, received from at least one of the one or more sensors 41-44, indicating that user 10 is approaching the back end of vehicle 30. Alternatively, system 70 may determine that user 10 intends to access the trunk of vehicle 30 based on acoustic analysis of the audio data, received from some of the one or more sensors 41-44, indicating that user 10 is approaching the back end of vehicle 30.

In some embodiments, system 70 may first analyze the video data to determine a location of remote controller 20 with respect to user 10. System 70 may determine whether user 10 holds remote controller 20 in his or her hand, e.g., by analyzing the video data to identify images of objects such as user's hand and remote controller 20 using any available object recognition techniques. If user 10 is holding the remote controller 20, then system 70 may determine that user 10 intends to open access point(s) of vehicle 30 by using remote controller 20, and in such case system 70 may take no action to open an access point automatically. In scenarios 100 and 200 shown in FIGS. 1 and 2, remote controller 20 is not held by user 10 and is stored in purse or backpack 24. In such case, more factors need to be considered by system 70 to determine the intention of user 10.

In some embodiments, upon determining that remote controller 20 is not located in the hands 15 of user 10, system 70 may further determine whether user 10 lacks a free hand to fetch remote controller 20, e.g., by analyzing the video data to identify images of objects such as user's hands and object(s) held by the user's hands using any available object recognition techniques. For instance, user 10 may have both hands 15 loaded with grocery bags or other carried items, or pushing a baby stroller or a dolly, or using a walker, and thus is not able to have a free hand. Alternatively, user 10 may be approaching vehicle 30 in or pushing a wheelchair, or wearing an arm sling, and thus not able to open any access point of vehicle 30 manually. In scenarios 100 and 200 shown in FIGS. 1 and 2, user 10 is pushing shopping cart 40 with both hands 15 on the shopping cart, and thus system 70 may determine that user 10 lacks a free hand to fetch remote controller 20.

In some embodiments, system 70 may, based on the analysis performed on the audio and video data provided by at least one of the one or more sensors 41-44, further determine which access point among multiple access points of vehicle 30 through which user 10 may intend to access the interior of vehicle 30. As shown in FIG. 2, vehicle 30 has at least three access points through which user 10 can access its interior, namely, rear access point 61, right access point 62 and left access point 63. This may be done by system 70 observing a trajectory of movement of user 10 as he or she approaches vehicle 30. FIG. 2 shows various possible trajectories 51, 52, 53, 54 and 55 of user 10 approaching vehicle 30. For example, if system 70 observes trajectory 51 to be how user 10 moves toward vehicle 30, system 70 may accordingly detect that rear access point 61 is the access point intended by user 10. Alternatively, if system 70 observes trajectory 52 to be how user 10 moves toward vehicle 30, system 70 may accordingly detect that right access point 62 on the right side of vehicle 30 is the access point intended by user 10. By the same token, if system 70 observes trajectory 53 to be how user 10 moves toward vehicle 30, system 70 may accordingly detect that left access point 63 on the left side of vehicle 30 is the access point intended by user 10. On the other hand, some trajectories, such as trajectories 54 and 55 shown in FIG. 2, may result in system 70 determining user 10 not intending to access the interior of vehicle 30.

In some embodiments, system 70 may take vicinity information into consideration in determining the intention of user 10. For example, upon detecting user 10 approaching vehicle 30 with a loaded shopping cart, system 70 may check the vicinity information it receives. For instance, when the vicinity information indicates a shopping mall near where vehicle 30 is parked, system 70 may determine that user 10 is more likely to have a positive intention to open rear access point 61 and access the trunk of vehicle 30. Similarly, if the vicinity information indicates a senior center is located within a vicinity of vehicle 30 while system 70 detects that user 10 is approaching vehicle 30 with a walker, system 70 may be more likely to interpret user 10 as having a positive intention to have a side access point opened automatically. Vicinity information may be received and utilized by system 70 in various ways. In some embodiments, vicinity information may be received by system 70 in a form of digital map from a Global Positioning System (GPS) on vehicle 30. In some embodiments, vicinity information may be received wirelessly by system 70 from a remote Advanced Driver Assistance System (ADAS) through satellite.

In some embodiments, in determining whether user 10 intends to access the interior of vehicle 30, system 70 may rely on more detailed information from the audio data and/or video data than a trajectory of user movement (such as trajectories 51-55 shown in FIG. 2). For example, system 70 may detect facial expressions of user 10, such as raised eyebrows, as an indication from user 10 that he or she intends rear access point 61 be opened automatically. For instance, detection of the facial expression of user 10 may be performed using a deep neural network (DNN)-based Facial Keypoint Detection System to find the position(s) of eyebrow(s) of the person in one or more images captured by a camera of system 70. In each image, points belonging to eyebrows may be clustered using nearest-neighborhood. Then, the position of the clusters may be observed over multiple images so as to detect raising and lowering of eyebrows. As another example, system 70 may detect postures of user 10, such as shrugging of shoulders, as an indication from user 10 that he or she intends trunk door 61 be opened automatically. For instance, detection of the shrugging of shoulders of user 10 may be performed by using a DNN-based Human Pose Estimation algorithm to detect the position(s) of joint(s) of the person in one or more images captured by a camera of system 70. By locating the position(s) of the joint(s) over multiple images, system 70 is able to detect shoulder shrugging of user 10. As yet another example, system 70 may track eyeball movements of user 10, thereby detecting a fixed gaze at vehicle 30 by user 10 for a predetermined period of time (e.g., a few seconds). The eyeball movements of user 10 may even reveal which access point among vehicle access points 61, 62 and 63 is desired to be opened by user 10, which may be also detected by system 70.

Upon having processed the various factors as mentioned above, system 70 may determine that user 10 does have a positive intention to access the interior of vehicle 30. System 70 may also detect one of the possible access points, namely, vehicle access points 61, 62 and 63, to be the access point intended by user 10. System 70 may then open the intended access point by energizing the one or more actuators (not shown in the figures) provided on vehicle 30. In some embodiments, the actuators may include a latch solenoid and a pre-sprung or motorized opening mechanism for the access point.

In some embodiments, the opening of the intended access point takes place as soon as system 70 determines a positive intention of user 10 along with the desired access point. In some embodiments, the opening of the intended access point takes place at a later time, when user 10 may get even closer to vehicle 30.

In some embodiments, the intention of user 10 to access the interior of vehicle 30, as well as which desired access point to open, may be transmitted directly to system 70 from remote controller 20 even when user 10 lacks a free hand for using the remote controller. Specifically, user 10 may register a command to open rear access point 61 before he or she touches shopping cart 40 and moves toward vehicle 30. The command may be registered by pressing one or more corresponding buttons on remote controller 20. As remote controller 20 enters communication range 75 of system 70, remote controller 20 may be able to transmit the pre-registered command to system 70. After receiving the pre-registered command, system 70 may be informed of the intended access point to open and thereby open it accordingly. The opening of the intended access point may be configured to take places as soon as the re-registered command is received by system 70, or at a later time when remote controller 20, carried by user 10, is within a threshold distance from vehicle 30.

Figure 3:
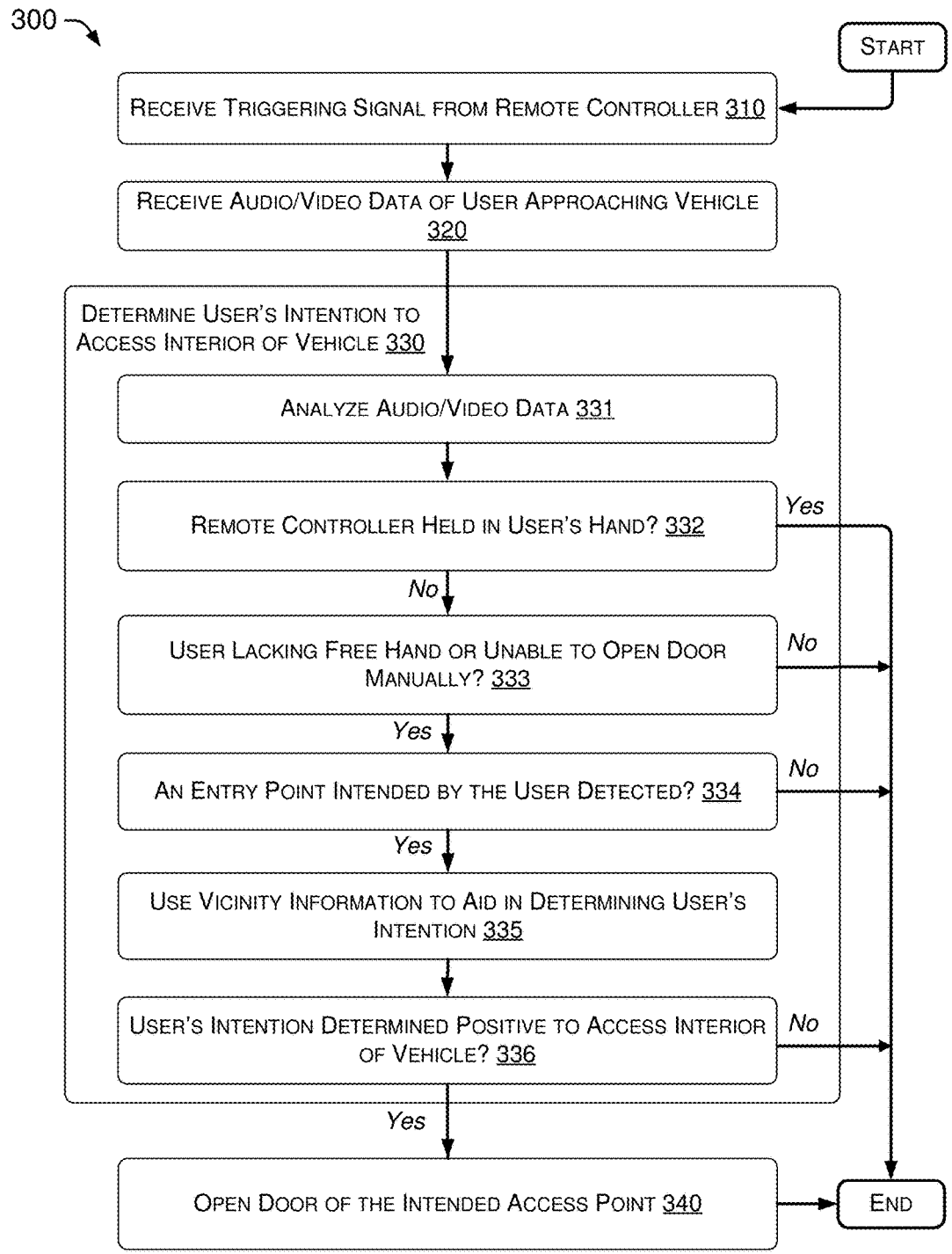
FIG. 3 is a flowchart of an example process in accordance with an embodiment of the present disclosure.

FIG. 3 illustrates an example process 300 for opening an access point of a vehicle in accordance with an embodiment of the present disclosure. Process 300 may include one or more operations, actions, or functions shown as blocks such as 310, 320, 330 and 340 as well as sub-blocks 331, 332, 333, 334, 335 and 336. Although illustrated as discrete blocks, various blocks of process 300 may be divided into additional blocks, combined into fewer blocks, or eliminated, depending on the desired implementation. Process 300 may be implemented by systems configured to open an access point of a vehicle, including system 70 as described herein and illustrated in FIGS. 1 and 2. For simplicity of description and not limiting the scope of the present disclosure, process 300 is described below in the context of example system 70. Process 300 may begin with block 310.

At 310, process 300 may involve system 70, which is installed, equipped, or otherwise provided on vehicle 30, receiving a triggering signal from remote controller 20 carried by user 10. Block 310 may be followed by block 320.

At 320, process 300 may involve system 70 receiving audio data and/or video data generated by at least one of one or more sensors 41, 42, 43 and 44 of vehicle 30, with the audio data and/or video data indicating user 10 approaching vehicle 30. Block 320 may be followed by block 330

At 330, process 300 may involve system 70 determining an intention of user 10 to access the interior of vehicle 30 based on the audio data and/or video data received from at least one of the one or more sensors 41, 42, 43 and 44. Block 330 may involve operations performed at sub-blocks 331, 332, 333, 334, 335 and 336. Block 330 may start at sub-block 331.

At 331, process 300 may involve system 70 analyzing the audio data and/or video data to acquire various information, which will be utilized in the following process steps. Sub-block 331 may be followed by sub-block 332.

At 332, process 300 may involve system 70 detecting whether remote controller 20 is held in a hand of user 10. In an event that system 70 detects that remote controller 20 is held in a hand of user 10, system 70 may end process 300. Otherwise, in an event that system 70 detects that remote controller 20 is not held in a hand of user 10, process 300 may proceed to sub-block 333.

At 333, process 300 may involve system 70 determining whether user 10 lacks a free hand or is unable to open an access point manually. In an event that system 70 determines that user 10 does not lack a free hand and is able to open an access point manually, system 70 may end process 300. Otherwise, in an event that system 70 determines that user 10 lacks a free hand and/or is unable to open an access point manually, process 300 may proceed to sub-block 334.

At 334, process 300 may involve system 70 detecting an access point, such as one of the access points 61, 62 and 63, through which user 10 intends to access the interior of vehicle 30. Specifically, in order to determine the access point into vehicle 30 intended by user 10, system 70 may observe a trajectory of a movement of user 10 as user 10 approaches vehicle 30, such as one of possible trajectories 51, 52, 53, 54 and 55. In an event that no access point intended by user 10 is detected, such as in the cases of trajectories 54 and 55, system 70 may end process 300. Otherwise, in an event that an access point intended by user 10 is detected, such as in the cases of trajectories 51, 52 and 53, process 300 may proceed to sub-block 335.

At 335, process 300 may involve system 70 utilizing vicinity information received by system 70 to aid in determining the invention of user 10 to access the interior of vehicle 30. For example, system 70 may receive digital map data regarding a vicinity of vehicle 30 and determine one or more types of business in the vicinity of vehicle 30 based on the digital map data. Sub-block 335 may be followed by sub-block 336.

At 336, process 300 may involve system 70 determining whether user 10 has a positive intention to access the interior of vehicle 30. In an event that system 70 cannot determine a positive intention of user 10 to access the interior of vehicle 30, system 70 may end process 300. Otherwise, in an event that system 70 determines that user 10 is positive about accessing the interior of vehicle 30, process 300 may proceed to block 340. In some embodiments, a positive intention of user 10 to access the interior of vehicle 30 may be determined by detecting a fixed gaze at vehicle 30 by user 10 for a predetermined period of time. In some embodiments, a positive intention of user 10 to access the interior of vehicle 30 may be determined by detecting an upward movement (e.g., shrugging) of shoulders or eyebrows of user 10 as he or she approaches vehicle 30.

At 340, process 300 may involve system 70 opening an access point at the intended access point determined at sub-block 334. This may be done by system 70 energizing one or more actuators provided at the intended access point on vehicle 30, such as a latch solenoid and a pre-sprung or motorized opening mechanism.

Figure 4:
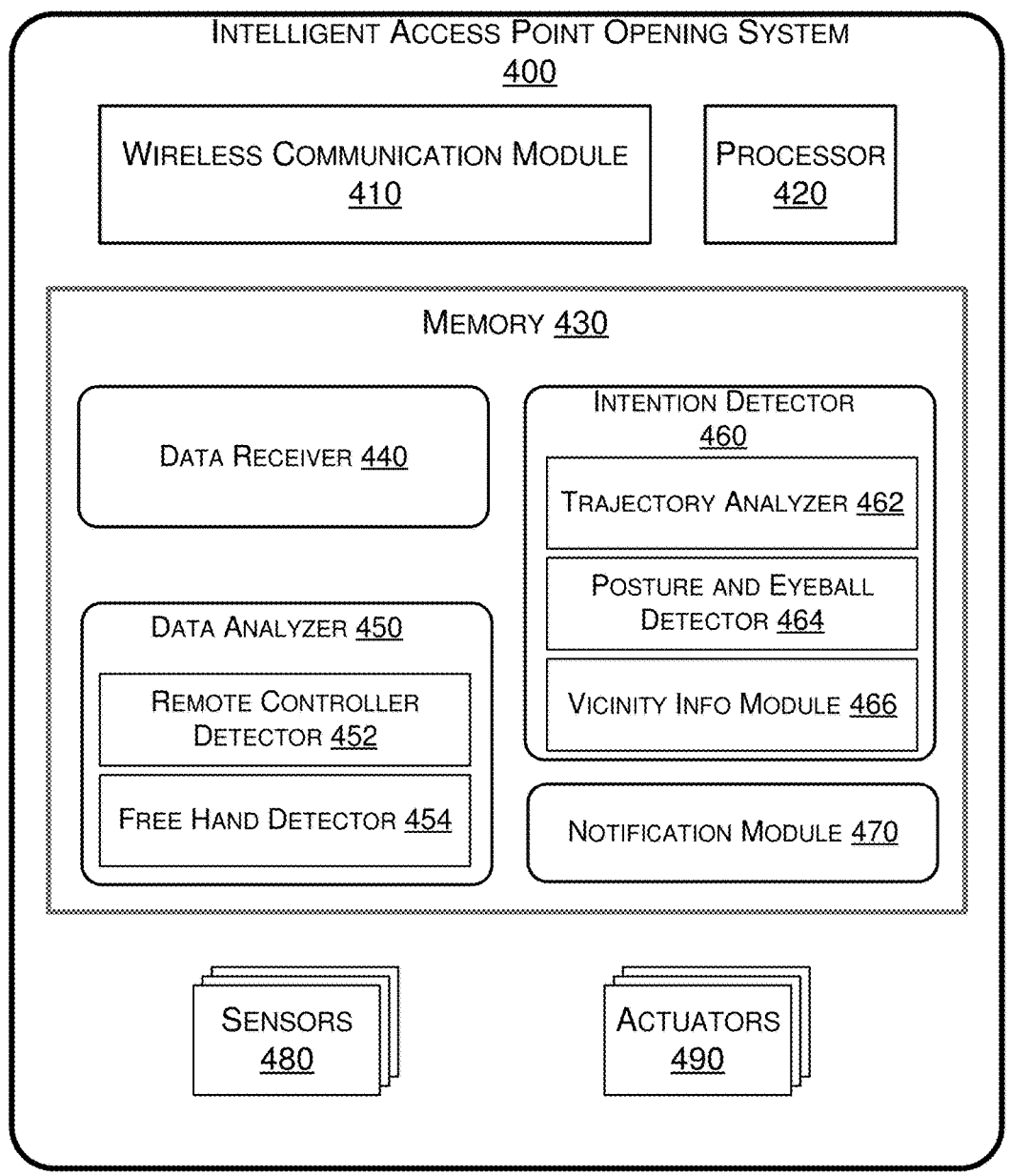
FIG. 4 is a diagram depicting an example system in accordance with an embodiment of the present disclosure.

FIG. 4 illustrates a system 400 for opening an access point of vehicle 30. System 400 may be an example implementation of system 70 described above, and may be installed, equipped or otherwise provided on a vehicle such as vehicle 30. System 400 may include wireless communication module 410 that is configured to receive a signal wirelessly from remote controller 20 when remote controller 20 is physically located within a range 75 from vehicle 30. The signal received may serve as a trigger for system 400 to start a process such as process 300. In addition, system 400 may include memory 430 that is configured to store various components, such as data receiver 440, data analyzer 450, intention detector 460 and notification module 470. System 400 may also include one or more processors, such as processor 420, configured to execute the various components stored in memory 430. System 400 may also include one or more sensors 480 and one or more actuators 490. In some embodiments, the one or more sensors 480 may include sensors 41, 42, 43 and 44 provided on vehicle 30 as described above. In some embodiments, the one or more actuators 490 may include a latch solenoid and a pre-sprung or motorized opening mechanism provided at an access point of vehicle 30 and configured to open the access point.

Data receiver 440 may be configured to receive audio data and/or video data indicating user 10 approaching vehicle 30. In some embodiments, the one or more sensors 480 may include a video camera and/or a microphone, and be configured to generate the audio data and/or video data.

Data analyzer 450 may be configured to analyze the audio data and/or video data, thereby acquiring helpful information. Data analyzer 450 may include remote controller detector 452 and free hand detector 454. Remote controller detector 452 may detect a location of remote controller 20 with respect to user 10 by analyzing the audio data and/or video data. That is, remote controller detector 452 may detect that remote controller 20 is located in purse or backpack 24 carried by user 10. Remote controller detector 452 may discern whether or not remote controller 20 is held in a hand of user 10. Free hand detector 454 may detect whether user 10 has a free hand available to open an access point of vehicle 30 manually.

Intention detector 460 may be configured to detect an intention of user 10 to access the interior of vehicle 30. Intention detector 460 may include trajectory analyzer 462, posture and eyeball detector 464 and vicinity information module 466. Trajectory analyzer 462 may be configured to analyze a trajectory of a movement of user 10 as he or she approach vehicle 30, such as possible trajectories 51, 52, 53, 54 and 55 in FIG. 2. Trajectory analyzer 462 may determine that user 10 has an intention to access the interior of vehicle 30 when user 10 shows a trajectory of movement like trajectories 51, 52 or 53. Moreover, trajectory analyzer 462 may determine one of a plurality of access points of vehicle 30 (e.g., one of access points 61, 62 and 63) as the access point through which user 10 intends to access the interior of vehicle 30 by analyzing the trajectory of user 10 approaching vehicle 30. On the other hand, trajectory analyzer 462 may determine that user 10 does not have an intention to access the interior of vehicle 30 when user 10 shows a trajectory of movement like trajectories 54 and 55. Posture and eyeball detector 464 may be configured to detect a posture, eyeball movement and facial feature of user 10, such as shrugging of shoulders, gaze and/or raised eyebrows, as an indication of user 10 intending to access the interior of vehicle 30. Vicinity information module 466 may be configured to receive digital map data regarding a vicinity of the vehicle from either an on-board source (e.g., GPS provided on vehicle 30) or a remote source (e.g., a remote ADAS). One or more types of business in the vicinity of the vehicle may be determined from the digital map to aid in determining user's intention to access the interior of vehicle 30. For example, data analyzer 450 may detect user 10 approaching vehicle 30 with both hands loaded with shopping bags while vicinity information module 466 determines there is a shopping mall close by. System 400 may thus determine that there is a higher chance for user 10 to want to access the interior vehicle 30 to put away the shopping bags in vehicle 30. As another example, data analyzer 450 may detect user 10 approaching vehicle 30 in or pushing a wheelchair while vicinity information module 466 determines there is a senior center right next to where vehicle 30 is parked. System 400 may thus determine that there is a higher chance for user 10 to want to open a side access point (e.g. right access point 620) and maneuver the wheelchair into vehicle 30.

Upon determining that user 10 does have an intention to access the interior of vehicle 30, notification module 470 may notify one or more actuators 490, either immediately or at a shortly later moment, to open one of vehicle access points 61, 62 and 63 as determined to be the intended access point of user 10.

Numerous advantages are resulted according to the systems and methods according to the various embodiments of the present disclosure. The advantages include, at least, unlocking and opening an access point of a vehicle intended by a user while the user either lacks a free hand when approaching the vehicle or is unable to open the access point manually.

The articles "a" and "an" are used herein to refer to one or to more than one (i.e., to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method comprising:
   receiving, by a system on a vehicle, audio or video data indicating a user approaching the vehicle;
   determining, by the system, an intention of the user to access an interior of the vehicle based on the audio or video data indicating a predefined movement of a body part of the user; and
   opening, by the system, an access point of the vehicle responsive to the determining,
   wherein the receiving of the audio or video data indicating the user approaching the vehicle comprises receiving, from a camera, a video indicating the user approaching the vehicle, and
   wherein the determining of the intention of the user comprises at least one of:
      detecting an upward movement of shoulders or eyebrows of the user; and
      analyzing the video to determine whether the user lacks a free hand or is unable to manually open a door at the access point.

2. The method of claim 1, wherein the video indicates the user approaching the vehicle with a cart, with a stroller, with a walker, or with a wheelchair.

3. The method of claim 1, wherein the determining of the intention of the user further comprises detecting a fixed gaze at the vehicle by the user for a predetermined period of time.

4. A method comprising:
   receiving, by a system on a vehicle, audio or video data indicating a user approaching the vehicle;
   determining, by the system, whether the user intends to access an interior of the vehicle based on the audio or video data; and
   opening, by the system, an access point of the vehicle responsive to the determining,
   wherein the determining of the intention of the user comprises:
      receiving digital map data regarding a vicinity of the vehicle; and
      determining one or more types of business in the vicinity of the vehicle based on the digital map data.

5. The method of claim 4, wherein the receiving of the audio or video data indicating the user approaching the vehicle comprises receiving, from a camera, a video indicating the user approaching the vehicle.

6. The method of claim 5, wherein the determining of the intention of the user comprises analyzing the video to determine whether the user lacks a free hand or is unable to manually open a door at the access point.

7. The method of claim 6, wherein the video indicates the user approaching the vehicle with a cart, with a stroller, with a walker, or with a wheelchair.

8. The method of claim 4, wherein the determining of the intention of the user further comprises detecting a fixed gaze at the vehicle by the user for a predetermined period of time.

9. The method of claim 4, wherein the determining of the intention of the user further comprises detecting an upward movement of shoulders or eyebrows of the user.

10. The method of claim 4, wherein the determining of the intention of the user further comprises:
observing a trajectory of a movement of the user indicating the user to be approaching the vehicle; and
determining, based on the trajectory, one of a plurality of access points of the vehicle as the access point through which the user intends to access the interior of the vehicle.

11. A method comprising:
receiving wirelessly, by a system on a vehicle, a signal from a remote controller carried by a user;
opening, by the system, an access point of the vehicle responsive to the signal indicating a command registered previously at the remote controller by the user within a predetermined time window before the receiving of the signal from the remote controller;
receiving, by the system, audio or video data indicating the user approaching the vehicle; and
determining, by the system, an intention of the user to access an interior of the vehicle based on the audio or video data.

12. The method of claim 11, wherein the receiving of the audio or video data indicating the user approaching the vehicle comprises receiving, from a camera, a video indicating the user approaching the vehicle.

13. The method of claim 12, wherein the determining of the intention of the user comprises analyzing the video to determine whether the user lacks a free hand or is unable to open a door at the access point manually.

14. The method of claim 13, wherein the video indicates the user approaching the vehicle with a cart, with a stroller, with a walker, or with a wheelchair.

15. The method of claim 11, wherein the determining of the intention of the user comprises detecting an upward movement of shoulders or eyebrows of the user.

16. The method of claim 11, wherein the determining of the intention of the user comprises:
receiving, by the system, digital map data regarding a vicinity of the vehicle; and
determining, by the system, one or more types of business in the vicinity of the vehicle based on the digital map data.

* * * * *